A. E. SPINASSE.
GLASS WORKING APPARATUS.
APPLICATION FILED OCT. 1, 1909.
1,167,534.
Patented Jan. 11, 1916.
2 SHEETS—SHEET 1.
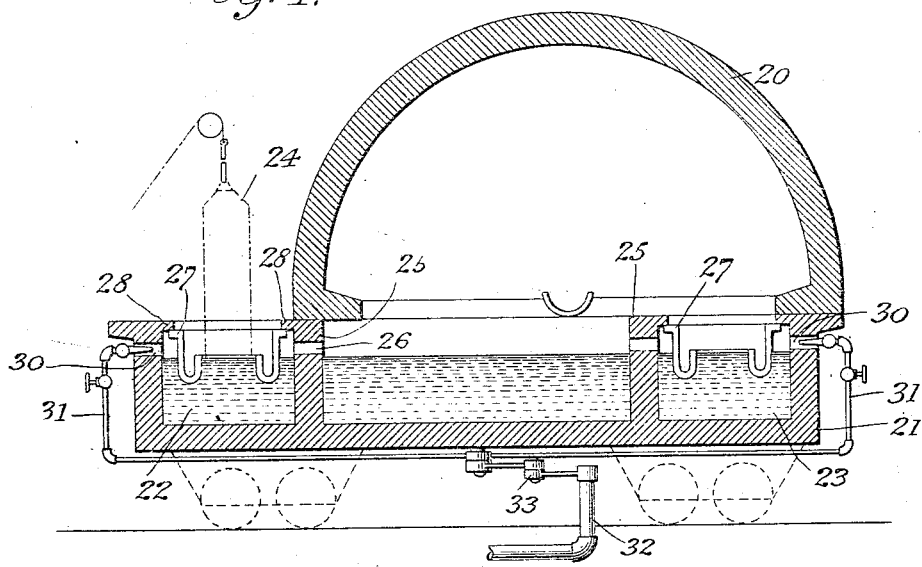
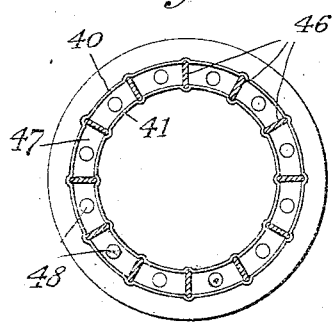
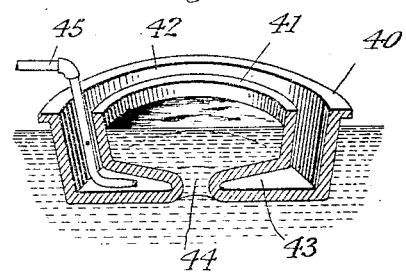
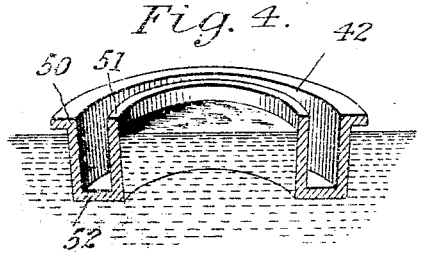
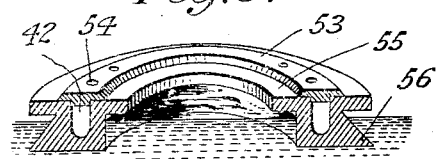

A. E. SPINASSE.
GLASS WORKING APPARATUS.
APPLICATION FILED OCT. 1, 1909.
1,167,534.
Patented Jan. 11, 1916.
2 SHEETS—SHEET 2.
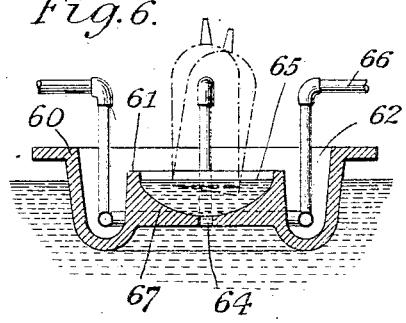
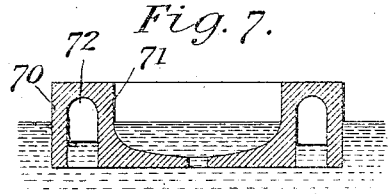
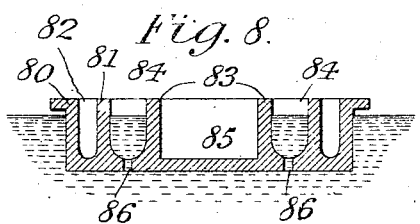
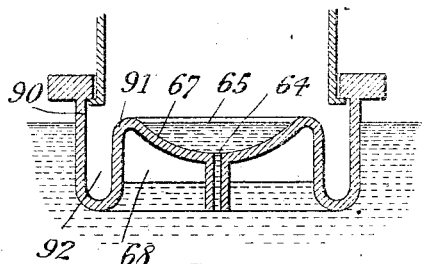
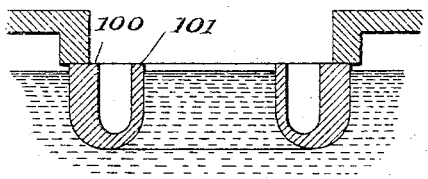
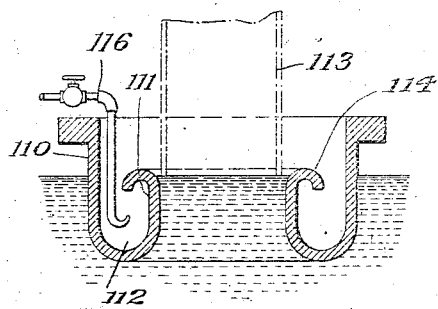
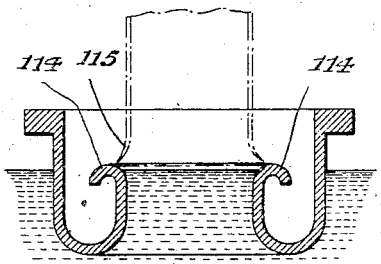
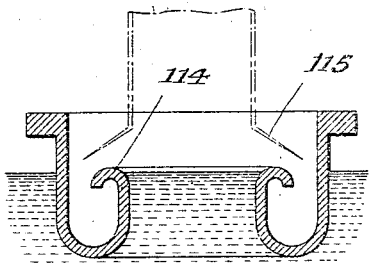

UNITED STATES PATENT OFFICE.

ARTHUR E. SPINASSE, OF MOUNT VERNON, OHIO.

GLASS-WORKING APPARATUS.

1,167,534.  Specification of Letters Patent.  Patented Jan. 11, 1916.

Application filed October 1, 1909.  Serial No. 520,495.

*To all whom it may concern:*

Be it known that I, ARTHUR E. SPINASSE, a citizen of the United States, residing at Mount Vernon, in the county of Knox and State of Ohio, have invented certain new and useful Improvements in Glass-Working Apparatus, of which the following is a full, clear, and exact description.

My invention relates to the drawing of glass and is particularly directed to the drawing of glass cylinders from a deep molten glass bath.

In order to properly present my invention it is necessary to explain something of the nature of glass along certain lines and to thereby explain and clear up certain obscurities which the workers generally in the art have only vaguely appreciated.

The nature of the glass is very peculiar and is probably beyond the understanding of the average glass worker. As a consequence, most of the improvements in this art have been no more than steps in the dark, some of them very lucky steps but most of them random steps which lead to failure. Without contemplating anything like a thorough discussion of this subject which could not properly be treated without consuming many pages, I may state that glass, even in a solid state, is made of fibrous and stringy constituents. When it is in a molten state these constituents seem to disappear, resulting in the formation of a homogeneous mass. However, if this same body or any portion thereof be continually or continuously subjected to a chilling action without forming the glass into an article as it is chilled, the homogeneity of the mass will frequently be destroyed, leaving the strings and fibers visible to the naked eye. Now, for successful drawing, the glass which is immediately formed into the cylinder or, at any rate, which is formed into an article in a comparatively short space of time after the chilling has set in, must be in a condition intermediate of the molten state and this state of chilled disintegration. On the other hand, it is equally desirable to keep the balance of the glass in its molten state so that it remains fluent up to the setting in of the proximate approach to the drawing area. Undoubtedly, there is a state of perfection for drawing glass in which the glass being formed into the article is of a certain viscosity more than molten and less than when this disintegration sets in.

Now, the desideratum is to attain this viscosity for the glass just as it reaches the point of draw and to gradually bring it to this degree of viscosity as it approaches the point of draw, at the same time confining the body of the glass to its molten state. So much for the nature of the glass. The bearing of this on my invention will be brought out hereinafter.

The nature of the drawing operation must first be understood to be that of stretching. The cylinder which is being formed is more effectively formed if it have a proper anchorage. This anchorage is, in part, the body of the glass and, in part, the adjacent surfaces of the ring or other refractory material. Many inventors in this art have not understood this and have, consequently, failed to understand the defeats they meet with. It is important to have a bait which will lift the upper end of the cylinder. It is of equal importance to have an anchorage for the lower end of the cylinder. It follows that the better this anchorage, the more successful will be the drawing operation. This is all needing explanation at this point but, if this is firmly kept in mind, the advance made by me will be much more clear than would be otherwise possible. Now, take the glass in the molten state as it approaches the delivery end of the tank. It is too low in viscosity for drawing. The proposition, therefore, is to increase the viscosity before it reaches the point of draw. Probably, the most well-known effort to do this has been by placing a ring in the glass at the delivery end of the tank and guarding the surface of the glass, excepting that portion within the ring, from the chill of the atmosphere. After each drawing operation, the surface within the ring is re-heated to reduce and is then permitted to chill. This would seem logical, at first blush, because it is certainly desirable not to chill the bulk of the glass at each drawing operation and it would appear that the bulk of the glass would not be chilled. My invention may be best described in comparison with this method. At each drawing operation under this method, the inventor chills the surface within the ring, that is, he initially chills the whole surface and then, after the cylinder is started, only the surface within the ring and external to the cylinder. Since glass is notoriously a poor conductor, it will be readily understood that there is only a film of the glass chilled and that the area of this film is very small while the cylinder is actually being drawn. The chilling action cannot penetrate to any appreciable extent below the surface of the bath. This naturally occasions a great deal of delay and numerous other more important difficulties.

My invention consists primarily in chilling a stratum of the glass bath in contradistinction to a superficial film. This stratum is ordinarily of defined depth although it is contemplated by me that the depth may be regulated. Furthermore, the chilling of a stratum of glass makes possible the chilling of the glass as it approaches the point of draw. This results in the gradual raising of the viscosity of the glass as it approaches the drawing surface. My invention contemplates the ultimate bringing of the surface glass to just the proper degree of viscosity for drawing or stretching and each successive substratum correspondingly less viscous to a determinate depth.

My invention, therefore, resides in segregating without entirely separating a stratum of the molten glass and chilling this segregated portion, as a stratum, without chilling the bulk of the glass metal to any material extent.

Further, my invention resides in producing a segregating element which is of a form to protect the main body of the glass from the cooling effect of the atmosphere and which is at the same time constructed with passages leading into contact with or rather contiguity to the substrata at various points.

Still further, my invention contemplates the utilization of a segregating element which is of such a form as to, itself, afford an anchorage for drawing or stretching the cylinder. This last, I preferably obtain by having the lower opening of the ring smaller than the drawing opening of such ring. This last may be attained in different ways and the natural way would seem to be the trending of the vertical wall of the ring toward horizontal. Variation of the relative position of the anchorage wall may be as regards the vertical wall of the pot or the horizontally trended wall. An example of what is meant arises from the fact that there is a tendency to draw a cylinder which is thick on the side away from the hot tank and thin on the side adjacent the hot tank. Now, the pot or ring may be shifted laterally. This lateral-shifting will vary the relation of the vertical wall of such pot or ring to the cylinder and therefore vary the anchorage and it will also vary the position of the inclined or horizontally trended wall below the surface toward or in relation to the cylinder, which will vary the anchorage. Also it will be apparent that the anchorage may be varied by depression or elevation of the segregating element. This is illustrative of the manner in which the thick-and-thin draw may be obviated.

One other feature of prime importance results from a preferred form of segregating element which I have shown in the drawings and which results from a greater completion of the horizontal trend of the vertical walls of such segregating element. It cannot but be realized that a completion of this horizontal trend of the walls of the segregating element will result in the formation of a pot which floats in a deep glass bath. But, this horizontal trend is not completed although nearly so. It is simply incomplete to the extent that there is left an underfeed aperture which is sufficiently large to permit a constant flow into the pot so formed and yet which is sufficiently small to knead and amalgamate the inflowing glass so as to produce a more homogeneous stratum from which the cylinder is drawn. Thus there results a constantly fed pot mounted in a deep bath of molten glass and affording all of the advantages of the pot furnace or successful external pot and adding numerous features of improvement. Some of these features of improvement arise from the fact that no ladling need be resorted to and no cleaning of the pots is necessary. Then there is one other feature of prime importance and this arises from the removal of danger of breakage.

Then it will be noted by reference to one of the figures of my drawings that I have also provided an elongated duct or conduit which not only makes for a more intimate mixture of my segregated strata of glass but takes the glass from a zone of comparative purity and then conducts it to the point of draw. The underfeed, of any kind, is more calculated to insure pure glass for the reason that all of the extraneous matter found floating on the surface of the glass bath is eliminated. The effect is accentuated when the feed conduit is extended from a zone in the glass which must be pure.

One other feature of importance to note is the provision of a segregating element of comparative buoyancy preferably rendered so by the provision of air spaces in its lower surface. It is desirable to make the ring of such form that it protrudes as far as possible above the surface of the glass for by this means the height of the chambers immediately surrounding the segregating element may be increased, it being desirable to have as great a body of heat over these surfaces in this area as possible.

With these and other incidental objects in view the invention consists in certain novel arrangement of parts, a preferred form of embodiment of which is shown in the accompanying drawings forming part of this specification.

In said drawings, Figure 1 represents a vertical sectionalized view showing a movable tank with surmounting hood, the tank containing floats for the drawing operation; and Figs. 2 to 11$^b$ inclusive show various forms of floats or rings embodying my improvements.

The general form of apparatus shown in Fig. 1 and comprising the hood and movable tank is similar to what is shown and described in my Patent No. 921,747, issued May 18th, 1909, but it is to be understood that these improvements are applicable to various other forms of glass working apparatus.

Referring now to said drawings, in Fig. 1 the stationary hood 20 surmounts the movable tank 21. This tank is formed with two compartments 22 and 23 at opposite extremities of the tank, the construction being such that the tank may be shifted laterally to expose first the compartment 22 for drawing (as shown at 24 in dotted lines in Fig. 1), and then the tank is shifted to the right to expose compartment 23 for a similar drawing operation. This construction is described more in detail in my aforesaid patent. The inner walls 25 forming said compartments are apertured as at 26 to permit flow of heat therethrough to contact with the surface of the glass contained in the drawing compartments and also into contact with the floats or rings. Said floats 27 are shown in Fig. 1, being suitably held in place by any convenient means, if desired, such for example as the projecting flanges 28. The outer walls of the tank are formed with apertures 30 through which project pipes 31 for conveying heat to the compartment and to the floats. A main supply heat pipe 32 has a flexible connection 33 with the said pipes 31 so as to permit a lateral shifting of the tank as aforesaid.

I will now describe the various forms of floats or rings that I have devised, it being understood that the various improvements embodied in these constructions may be utilized conjointly or separately if desired, and for the sake of clearness these improvements are shown and described separately.

In the operation of drawing glass from a quantity of the molten glass, a method which has heretofore been used consisted in ladling a portion of molten metal from a supply tank to the pot or receptacle from which the article is to be drawn. Such a process affects the quality of the glass metal, occasioning bubbles, string, and marring of all sorts. Furthermore, as the portion which has been ladled, is somewhat of an uneven density, this will produce a glass article with wall correspondingly uneven producing what is called "thick and thin". After each succeeding operation the unused residue is sometimes very great and must be handled and remelted. It is one of the aims of my invention to provide an improved means of securing a proper portion of the molten glass for drawing and to overcome these difficulties. I have devised a form of pot or float, which will separate a portion of the molten glass and in so doing will preserve uniformity of density. I also provide for heating this pot or float in such manner as to give the molten glass the desired plasticity at any desired point below the surface. Various other advantages will flow from my improvements as will be apparent from a detailed consideration of them as set forth below.

In Fig. 2 is shown what may be termed a double-walled pot or float. The outer wall 40 and inner wall 41 are separated by intervening air chamber 42. Said walls are extended horizontally inward to form a double pot as shown in Fig. 2, thus leaving an air chamber 43 beneath the inner pot. An aperture 44 permits the molten glass to flow upward so as to fill this inner pot with a portion of the molten glass, and from this inner pot the drawing is effected. This float is placed on the surface of the drawing compartment containing the molten glass and the glass flows through the aperture 44 to fill the inner pot and thereby separate this portion of the glass for drawing purposes. And the glass in the inner pot will then not vary in density as would be the case of ladling into such a pot, and the molten glass will be received uniformly into this inner pot. That is, if the glass tends to become more plastic at one point it will remain so indefinitely, so that the apparatus will require only one adjusting. A pipe 45 may be led down into the side air chamber 42 or the lower air chamber 43 so as to convey heating gas to these portions and thereby heat the pot at any desired point to remedy or adjust the inequalities in temperature and plasticity. Adjustment having once been made, as above stated, this adjustment will remain sufficient for continued drawing without the necessity of change, and in this manner the thick and thin blemishes can be remedied. This construction enables the bottom of the inner drawing pot to be heated as well as the sides thereof. Of course it will be understood that these pipes may be used for transmission of a cooling medium to any desired point, if it be necessary or desirable to cool at such point. Another advantage of this construction is that the drawing pot is filled from beneath the surface, thereby avoiding floating impurities on the top of the molten glass, which in the ladling process might be gathered in and poured into the drawing pot so as to cause later trouble.

In order to arrange for confining the heating to specified chambers or locations, I have devised partitions 46, shown in Fig. 3, which intervene between the inner and outer walls 41 and 40 and divide the side air chamber 42 into a plurality of separate compartments 47. The heating or cooling pipes 45 may then pass downward as at 48, one being reserved for each compartment and thereby heating that particular point to the desired extent and independently of the others.

In Fig. 4 the inner aperture is shown enlarged so as to make a double walled ring of substantially vertical sides. These sides 50 and 51 are connected at their lower ends by the circular bottom 52. This provides the side air chamber 42 as above described but the inner pot from which drawing is effected has no lower or bottom wall with air chamber beneath it for heating.

In Fig. 5 I have shown a double-walled ring having a circular cover 53 which may be used to extend across between the inner and outer walls and thus more securely confine the air within the air chamber 42. Apertures 54 may be used in the cover to permit the insertion of the heat regulating pipes, as above described. This particular float herein shown has an inner flange 55 and an outer flange 56, the latter being inclined to the surface of the glass. This construction is described and claimed in a copending application filed by me, Serial No. 525,428, filed October 30, 1909.

In Fig. 6 I show the double-walled float having the outer wall 60 and inner wall 61 with the lateral air chamber 62 and the lower aperture 64 leading into the inner pot 65. The pipes 66 are for conducting heating or cooling mixtures to the air chamber and pot. It will be observed that the inner pot has its bottom wall 67 semi-spherical shape in order that it may evenly adjust itself with reference to the level of the glass within the pot. That is, if the float or pot should get out of level (as indicated by the dotted line positions of the bait and cylinder in Fig. 6) this will not affect the drawing depth of the glass within the inner pot, by reason of this semi-spherical formation. This makes a sort of self-equalizing or self-adjusting arrangement in case the float should for any reason shift out of its ordinary level.

In Fig. 7 is shown a form of double-walled float of the inverted type, the outer wall 70 and inner wall 71 being open at the bottom instead of the top, and being closed at the top to form the inclosed side air chamber 72. The air inclosed therein will prevent the glass from rising up and filling the same.

In Fig. 8 is shown a float having an outer wall 80, an intermediate wall 81, with an intervening side air chamber 82, and then an inner wall 83. The walls 81 and 83 form an annular pot 84, thus presenting a ring of molten glass for drawing, which portion is isolated from the outer mass of glass by the circular air chamber 82 and the inner hollow chamber 85. Apertures 86 conduct the molten glass from the bottom up into the drawing chamber 84. Similar heating arrangements may be utilized for the air chambers 82 and 85, if desired.

In Fig. 9 the outer wall 90 and the inner wall 91 form the usual side air chamber 92. The aperture 64 leads up into the inner or drawing pot 65 so as to supply molten glass to the inner pot and thereby isolate this portion of the glass for drawing purposes; and the bottom wall 67 of said pot is semi-spherical as above described in connection with Fig. 6. The spacing of the inner wall 91 and the tube forming the aperture 64 results in the formation of the inclosed air chambers 68 which maintain an even temperature and contact with the lower side of the bottom of the drawing pot 65.

In Fig. 10 the outer wall 100 is of materially greater thickness than the inner wall 101 for the purpose of equalizing the coefficient of expansion of material of which the float is made, the outer ring of course tending to expand to a greater extent than the inner ring owing to the greater linear dimension of its periphery.

Figs. 11, 11ª and 11ᵇ all show the outer wall 110 and inner wall 111, with side air chamber 112 surrounding the interior portion of the molten glass from which the glass cylinder 113 is to be drawn as shown in dotted lines. The inner wall 111 has its upper end bent over to form an edge or rim 114. In Fig. 11, the glass cylinder is shown partly drawn and ready for separation; and then in Fig. 11ª the position of the lower end of the glass cylinder is shown in dotted lines after compressed air has been introduced within the cylinder, thus bringing the lower wall 115 of the cylinder into contact with the rim 114. In Fig. 11ᵇ the inner compressed air has forced the lower rim 115 of the cylinder away from the glass mass and over the rim 114. The cylinder is thus entirely separated from the mass of glass within the drawing pot and the drawing operation thereby completed for that particular cylinder by means of the ascending movement of the glass cylinder. The inner wall 111 and particularly the rim 114 are maintained hot by means of suitable burners 116 shown in Fig. 11 and utilized as above suggested. This latter process of separating the cylinder from the molten glass at the lower end of the cylinder could likewise be utilized in connection with the float such as is shown in Fig. 9 where the inner drawing pot has a similar curved line surrounding the same.

While the forms of construction herein shown and described constitute preferred forms of embodiment of my improvements, it is to be understood that various other forms might be utilized all coming within the scope of my invention as set forth in the claims below.

What is claimed is as follows:

1. In combination with a deep glass tank, a device for segregating a quantity of glass without disturbing its horizontal stratification, said device being provided with means whereby temperature controlling agents may be brought into effect at desired or predetermined points in the periphery of the said device, for the purpose of controlling or modifying the viscosity of the segregated glass at such points.

2. In combination with a deep glass tank, a device for segregating without horizontal disturbance a mass of glass, said device having channels extending below the surface of the glass, whereby temperature controlling means may be applied to affect the viscosity of the segregated mass of glass at will, at points below the surface of said segregated mass.

3. In combination with a deep glass tank, a ring adapted to float in the glass in said tank and to segregate a mass of said glass without permitting disturbance of its horizontal relation, said ring being provided with channels or conduits extending below the surface of the glass whereby temperature affecting agents may be applied at desired points in the periphery of the ring to modify the temperature of the ring and hence affect the viscosity of the glass.

4. In combination with a deep glass tank, a ring adapted to float in the glass and to segregate without horizontal disturbance a portion from the body of said glass, said ring being provided with a border extended above the surface of the glass and adapted to form an anchorage for a drawing cylinder, and means for modifying the temperature of said ring at desired points in order to control the thickness of the walls of the drawing cylinder at these points and thereby procure the draw of a cylinder having walls of uniform thickness.

5. In combination with a deep glass tank, a ring adapted to float in said tank and segregate a portion of the glass in said tank, a border forming a drawing ledge on said ring, and said ring having an opening in the bottom thereof of a size sufficiently small to aid in effecting the commingling of imperfectly mixed portions of the body of the glass as they pass through said ring.

6. In combination with a deep glass tank, a ring adapted to float in said tank and segregate a portion of the glass in said tank, a border forming a drawing ledge on said ring, said ring having an opening, said opening extending into a channel of a size sufficiently small to aid in effecting the commingling of imperfectly mixed portions of the body of the glass as they pass through said ring.

7. In combination with a deep glass tank, a pot adapted to float in the glass in said tank, the interior of said pot being formed to be substantially the segment of a sphere and having an opening in the bottom thereof sufficiently small to aid in effecting the commingling of imperfectly mixed quantities of molten glass.

8. In combination with a deep glass tank, a pot adapted to float in the glass in said tank, the interior of said pot being formed to be substantially the segment of a sphere and having an opening in the bottom thereof sufficiently small to aid in effecting the commingling of imperfectly mixed quantities of molten glass, said pot being also provided with a channel adapted to extend below the surface of the molten glass.

9. In combination with a deep glass tank, a pot adapted to float in the glass in said tank, the interior of said pot being formed to be substantially the segment of a sphere and having an opening in the bottom thereof sufficiently small to aid in effecting the commingling of imperfectly mixed quantities of molten glass, said pot being provided with a channel open to the air and adapted to extend below the surface of the molten glass, and means in said channel for affecting the temperature of the glass and therefore its viscosity.

10. In combination with a deep glass tank, a pot adapted to float in the glass in said tank, the interior of said pot being formed to be substantially the segment of a sphere and having an opening in the bottom thereof sufficiently small to aid in effecting the commingling of imperfectly mixed quantities of molten glass, said pot having a channel adapted to extend below the surface of the glass in the tank and also having a drawing ledge so related to a drawing cylinder that said cylinder anchors itself thereon, and means in said channel for affecting the temperature and viscosity of the glass in the pot at will and thereby affecting the anchorage of the drawing cylinder to the ledge.

11. In combination with a deep glass tank, a pot for drawing glass, adapted to float in the glass of said tank, and an opening in the bottom thereof of such dimensions as to effect the commingling of the molten glass as it passes therethrough into the interior of said pot for drawing.

12. In combination with a deep glass tank, a pot adapted to float freely to desired positions in the molten glass of said tank, said pot having an opening in the bottom thereof, said opening being of such dimensions as to aid in effecting the commingling of molten glass as it passes through said opening into the interior of the pot during draw, and means adapted to engage the upper part of said pot to maintain said float pot in suitable position relative to the drawing element or tool.

In testimony whereof I affix my signature in the presence of two subscribing witnesses.

ARTHUR E. SPINASSE.

Witnesses:
 HERBERT C. WOOD,
 ROLLIN R. McINTIRE.